April 11, 1961 E. PLANITZER 2,979,285
MISSILE STRUCTURES
Filed Sept. 30, 1959
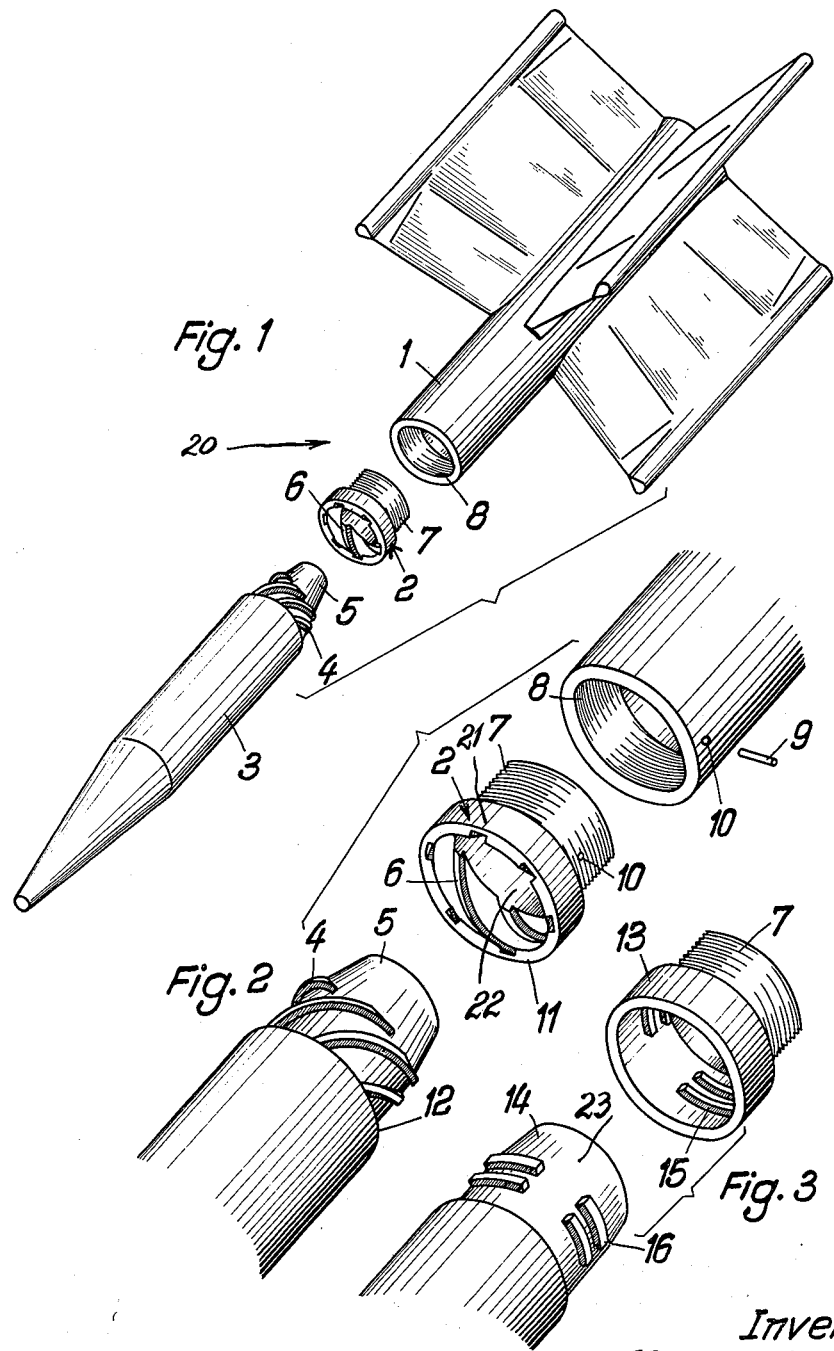
Inventor:
ERICH PLANITZER
BY Leon M. Straws
AGT.

United States Patent Office

2,979,285
MISSILE STRUCTURES

Erich Planitzer, Nurtingen, Wurttemberg, Germany, assignor to Bolkow-Entwicklungen Kommanditgesellschaft, Ottobrunn, near Munich, Germany Filed Sept. 30, 1959, Ser. No. 843,445

Claims priority, application Germany Oct. 10, 1958

19 Claims. (Cl. 244—14)

The present invention relates, in general, to missiles and, in particular, to means for coupling the missile parts or components thereof together.

In missiles of the dirigible type it is desirable to removably couple the front portion or pay load head to the body or fuselage. This is necessary in many cases to facilitate the transportation of the missile, to achieve an improved coupling of the missile parts, and also for reasons of safety. The assembly of the missile before use must be very simple, safe and without any loss of time.

In general, both the weight and the center of gravity of the missile head are fixed. However, the body or fuselage, which contains the propulsion mechanism and mounts the steering equipment, must be correctly adjusted upon assembly of the missile components or parts.

The required adjustment may be effected with rapid union means, such as a screw adjustment. However, due to the different requirements and the different construction needed for each of the foregoing functions, it is not possible to fulfill both functions with one and the same screw connection.

It is an object of the present invention to provide means facilitating the combination of rapid coupling and adjusting functions in one structural part.

It is another object of the present invention to provide means fulfilling the requirements of simple and fast assembly and disassembly, and center-of-gravity adjustment in a simple and highly efficacious manner utilizing only a single structural part which is easy to manufacture in large quantity.

The above and other objects of the invention will become further apparent from the following detailed description, reference being made to the accompanying drawing, showing preferred embodiments of the invention.

In the drawing which illustrates the best modes presently contemplated for carrying out the invention:

Fig. 1 is an exploded view of a missile constructed pursuant to the present invention;

Fig. 2 is a fragmentary view of a missile, similar to Fig. 1, drawn to an enlarged scale; and Fig. 3 is a view similar to Fig. 2 and illustrates a modified form of the invention.

Briefly described, pursuant to the present invention, there is provided a coupling member for a missile, which member has two different threads. One thread is one-half of a quick-coupling means, whereas the other thread is a fine thread for center-of-gravity adjustment. The quick-coupling thread is preferably at the front of the coupling member for connection with the pay load head. The adjusting thread is at the rear of the coupling member for connection with the missile body. The quick-coupling thread is preferably a multi-turn thread and has low precision. It simply possesses a mount which in tightened condition of the quick-coupling thread insures a definite position of the two parts in relation to each other. Frictional locking of the parts prevents inadvertent automatic release or disengagement of this connection.

The thread utilized to adjust the center of gravity is constructed to minimize the play between the parts to the utmost. It is possible to arrest and secure the parts in every position thereof. The arresting function is achieved preferably by a locking bolt which, after the adjustment is made, is driven into a hole which is bored for this purpose.

It is preferable to fabricate the coupling member from epoxide resin. The cooperating member is made of a light weight metal, preferably an electrum injection die-cast alloy. The resiliency of the plastic provides the advantage that, upon a firm tightening of the parts, an elastic deformation occurs in the thread turns, so that an inadvertent disengagement of the parts is reliably prevented. In addition, the part cooperating with the adjusting thread is made of a light metal. Due to the good glide or slide effect between metal and plastic, there is still sufficient mobility even with extremely little play between the parts, and even under relatively slight compression. In addition, the two materials advantageously are well suited for injection molding, in the case of the plastic, and die-casting in the case of the metal, so that low cost mass production, at extremely small tolerances in the workpiece, is rendered possible.

Referring now to Figs. 1 and 2 of the drawing in detail, there is shown a dirigible type missile 20, pursuant to the present invention. The missile comprises a body member or fuselage 1 which is coupled to a pay load head 3 by a a coupling member 2. The head 3 is provided with a raised six-turn thread 4 which is threaded into the helical groove thread 6 provided at the inner surface of a coupling member 2 at the forward end thereof. The coupling member 2 is formed of a suitable plastic, preferably epoxide resin.

Due to the multiple turns, the large pitch of threads 4 and 6 effects a quick-coupling action. After about a quarter rotation, of either the coupling member 2 or the head 3, the thread is fully tightened so that the coupling head collar 21 is in engagement with the shoulder 12 of head 3. The head 2 is fabricated from a light metal. As the synthetic resin thread 6 clamps firmly against the light metal thread 4, a definite indisplaceable position between coupling the member and the pay load head is established so that they are fixed in relative position. The raised thread 4 is formed on a conical part 5 which projects forwardly of the shoulder 12. The part 5 facilitates the insertion of the outer raised thread 4 into the inner grooved thread 6 to form an acme or buttress thread.

The bore 22 of coupling member 2 is complementary to projection 5 but is in cylindrical form and of a slightly larger diameter. In this way, a relative canting of one of the two threaded parts is prevented.

Referring now to Figure 3, there is shown a modification of the present invention. The coupling member 13 and the head 14 are provided with socket threads 15 and 16, respectively. Thread 15 is grooved at the inner surface of collar 13 and threads 16 are raised on the projection 23 of the head. The telescoping of threads 15—16 and relative rotation of the parts by a small angle results in a tight, self-locking joint or connection. In all other respects the coupling member 13 and head 14 are similar to coupling member 2 and head 3, respectively.

It will be noted that in both embodiments, a gross thread connection is utilized to connect the head to the coupling member.

The coupling between coupling member 2, or member 13, and the fuselage is effected by a very much finer screw thread connection than that between the coupling member 2 or 13 and head 3 or 14, respectively. More specifically, a one-turn screw thread connection is effected by the small pitch thread 7 on member 2 or 13 which engages in a complementary small pitch thread 8 at the inner surface of the fuselage.

The screw connection 7—8 can be fixed in every adjusted position thereof by first providing a bore 10 in each of the coupling members and fuselage when they are correctly adjusted for center-of-gravity and then forcing a bolt 9 into the aligned bores 10 to lock the parts together. The screw threads 7 and 8 have practically no play so that a definite position is assured in each position of adjustment.

In assembling the missile 20, the coupling member 2 or 13 is first threaded onto the head 3 or 14 and manually tightened. The secured together head and coupling member are then threadedly engaged with the fuselage, by threading threads 7 and 8, until the previously determined and established center-of-gravity position is exactly correct. In this position, fuselage and connecting member are bored, as at 10, and the bolt 9 is inserted into the bores. The rapid coupling between the head and coupling member can then be disengaged so that the head 3 can be separately transported.

It will be apparent from the foregoing, that the present invention provides both for a simple and rapid assembly and disassembly, as well as a center-of-gravity adjustment using only one structural part which is relatively simple to manufacture.

The use of the selected materials results in a firm fit of the rapid connection means which is secured by a functional locking action. The use of plastic for the fit of the adjusting thread provides the advantage that there is an absence of play so that it is possible to provide a definite position of the two connecting parts without an excessively high torque to tighten the screw connection. Further, by combining the functions of a rapid connecting means with a fine adjusting means in one structural part, the two different threads are each located at the point most favorable for achieving maximum effect. The pay load head comprises the main weight of the missile so that the displacement of this weight in relation to the balance of the missile is most effective for trimming the missile. Small displacements of the main weight result in large changes in load distribution. This is particularly true of short-range missiles where the pay load is a substantial part of the total weight.

Various changes and modifications may be made without departing from the spirit and scope of the invention and it is intended that such obvious changes and modifications be embraced by the annexed claims.

Having thus described the invention, what is claimed as new and desired to be secured by Letters Patent is:

1. In a missile having a head member and a body member, a coupling member for coupling said head member to said body member, said coupling member having center-of-gravity adjusting means in the form of an adjustable fine thread connection of small lead with said body member and a gross thread connection of large lead with said head member.

2. A missile as set forth in claim 1, said coupling member having an exterior surface which forms part of the exterior surface of the missile in assembled condition.

3. A missile as set forth in claim 1, said gross thread connection comprising raised helical threads of large pitch provided on the head member and grooves complementary to said threads in said coupling member.

4. A missile as set forth in claim 1, said gross thread connection comprising raised interrupted socket threads on the head member, and complementary grooves defined in said coupling member.

5. A missile as set forth in claim 1, said gross thread connection comprising a rapid coupling formed by acme thread means.

6. A missile as set forth in claim 1, said fine thread connection being free of play.

7. A missile as set forth in claim 1, and means to lock said small fine thread connection in gravity adjusted position.

8. A missile as set forth in claim 7, said locking means comprising a locking bolt engaged in said coupling and body members through the fine thread connection thereof.

9. A missile as set forth in claim 1, wherein the coupling member is made of plastic and the other members are made of metal.

10. A missile as set forth in claim 9, wherein the coupling member is made of epoxide resin.

11. A missile as set forth in claim 9, wherein the other members are made of a light metal.

12. A missile as set forth in claim 11, wherein the other members are made of an electrum alloy.

13. A missile, comprising in combination: a head member, a body member, a combined coupling and center-of-gravity adjusting member intermediate said head and said body members, first quick-coupling means on one end of said combined coupling and center-of-gravity adjusting member, second quick-coupling means on one of said head and body members, said first and second quick-coupling means being complementary for effecting quick coupling engagement thereof, first center-of-gravity adjusting means at the opposite end of said combined coupling and center-of-gravity adjusting member, and second center-of-gravity adjusting means on the other of said head and body members, said first and second center-of-gravity adjusting means being complementary and being adapted for adjustable coupling engagement with each other.

14. A missile as in claim 13, wherein one of said first and second quick coupling means comprises raised portions extending along a helical path, while the other of said first and second quick coupling means comprises grooves complementary to said raised portions.

15. A missile as in claim 13, wherein said combined coupling and center-of-gravity adjusting member has an exterior surface which forms part of the exterior surface of the missile in assembled condition.

16. A missile, comprising in combination: a head member, a body member, a combined coupling and center-of-gravity adjusting member intermediate said head and body members, first quick coupling means on one end of said combined coupling and center-of-gravity adjusting member, second quick coupling means on said head member, said first and second quick coupling means being complementary for effecting quick coupling engagement thereof, first center-of-gravity adjusting means at the opposite end of said combined coupling and center-of-gravity adjusting member, and second center-of-gravity adjusting means on said body member, said first and second center-of-gravity adjusting means being complementary and being adapted for adjustable coupling engagement with each other.

17. A missile as in claim 16, wherein said locking means comprises pin means passing through said complementary fine multiple thread means.

18. A missile, comprising in combination: a head member, a body member, a combined coupling and center-of-gravity adjusting member intermediate said head and body members, complementary thread means having a large lead on one end of said combined coupling and center-of-gravity adjusting member and said head member for effecting quick coupling engagement between said combined coupling and center-of-gravity adjusting member and said head member, complementary center-of-gravity adjusting means on the opposite end of said combined coupling and center-of-gravity adjusting member and said body member, said center-of-gravity adjusting means comprising a fine multiple thread of small lead for effecting adjustable coupling between said body portion and said combined coupling and center-of-gravity adjusting member.

19. A missile, comprising in combination, a head member, a body member, a combined coupling and center-of-gravity adjusting member intermediate said head and body members, complementary thread means of large lead on one end of said combined coupling and center-of-gravity adjusting member and said head member, for effecting quick coupling engagement therebetween, complementary fine multiple thread means of small lead on the other end of said combined coupling and center of gravity adjusting member and said body member, for effecting adjustable coupling connection and center-of-gravity adjustment therebetween, and locking means for locking said complementary fine multiple thread means into position after the center-of-gravity adjustment has taken place.

References Cited in the file of this patent

UNITED STATES PATENTS

| | | |
|---|---|---|
| 1,300,365 | Fletcher | Apr. 15, 1919 |
| 2,454,137 | Claypool | Nov. 16, 1948 |
| 2,918,870 | Meister | Dec. 29, 1959 |
| 2,932,252 | Korn | Apr. 12, 1960 |